Patented Jan. 4, 1944

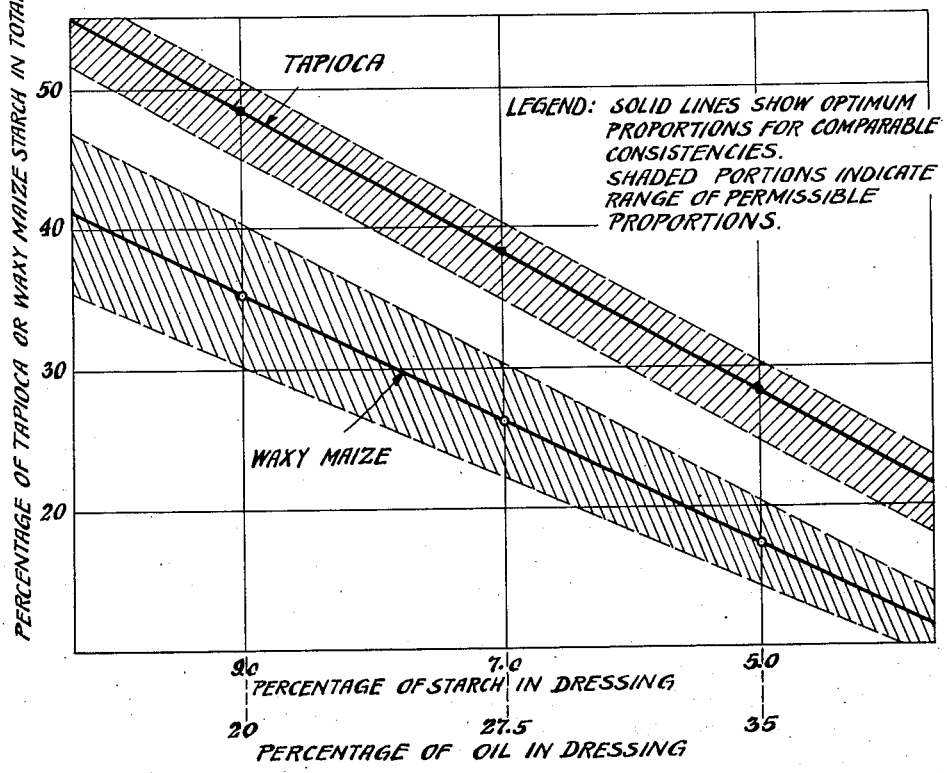

2,338,083

UNITED STATES PATENT OFFICE 2,338,083

SALAD DRESSING

Ben F. Buchanan, Leonia, N. J., and Richard C. Drury, Skokie, Ill., assignors to American Maize-Products Company, a corporation of Maine Application December 18, 1942, Serial No. 469,742

3 Claims. (Cl. 99—144)

This invention relates to salad dressing.

Commercial salad dressings ordinarily comprise an intimate emulsion of a base of pasted starch, egg yolk, an edible oil, vinegar or other acid, water, salt, and a sweetening agent. Usually they include also gums, spices, flavoring materials, and the like.

A satisfactory and high quality salad dressing has not been made heretofore with corn starch alone, but has required the addition of a relatively large proportion of tapioca or arrowroot starch or both and frequently also the addition of gums such as locust bean gum to aid in the stabilization. Cornstarch when used alone in the past has given a salad dressing of relatively rigid body which was sensitive to temperature change and tended to form fissures thus leading to syneresis and general breakdown of the emulsion. In general such a dressing had a relatively short shelf life.

We have now discovered that we can use corn starch as the sole starch in the making of a stable, high quality salad dressing, also without the use of any gum, provided the usual corn starch is used in combination with a substantial proportion of corn starch of the kind known as waxy maize starch.

In addition to using only starches derived domestically from various kinds of corn or maize, the invention provides a salad dressing in which the waxy maize starch, for a given consistency of the dressing and proportion of oil, composes less of the total starch than is the case when tapioca or arrowroot starch is used. Furthermore, the invention provides a salad dressing in which there is a greater tolerance in the allowable proportion of the waxy maize starch, so that accidental or intended variations in proportioning of the starches or other ingredients to each other may be larger without interfering with the development and maintenance of the proper and desired consistency, than is the case when tapioca or arrowroot starch is used in association with corn starch. The term "corn starch" is used here and elsewhere herein to designate starch made by conventional manufacturing operations, including separation, purification, and sometimes modification from the usual commercial varieties of corn, as distingushed from "waxy starch" from waxy maize or other waxy cereal.

Briefly stated, the invention comprises a salad dressing in which the starch base is substantially exclusively corn starch supplemented by waxy maize starch, other ingredients being present in about the proportions that are conventional in salad dressing except that, for a given proportion of the waxy maize starch, there may be used substantially less of the expensive oil component than is required in salad dressings of the same consistency including as the starch base a mixture of corn starch and the same proportion of tapioca starch, the proportion of the total starch being greater in the waxy maize formula than in the tapioca formula. The oil component is the dispersed phase.

The use of the waxy maize starch in combination with a modified or unmodified corn starch and the other ingredients of the salad dressing decreases the shortness of the gel, reduces the tendency to set to such a relatively stiff mass as to show cracking on being disturbed, as by jarring or changing temperature, and reduces also the tendency to syneresis which, if it occurs, causes the gel to exude liquid, ordinarily called "weeping." In the proportions used the waxy maize starch, on the other hand, does not induce objectionable or excessive stringiness.

While the invention is not limited to any theory of explanation of the result caused by the waxy maize starch, it is considered that an important part of the effect is due to the difference in properties of the starch of branched chain structure in the waxy maize starch from that in other starches.

As the oil for the salad dressing, there is selected one commonly used in such products, as, for example, cottonseed, corn, or soya bean oil.

The sweetening agent is ordinarily sucrose but may be dextrose, invert sugar, or the like. In place of common vinegar as the acidulent, there may be used distilled vinegar or other food acid such as lactic, citric or the like.

Suitable proportions as well as preferred proportions of the various ingredients are shown in the table below, the proportions being expressed as the number of parts by weight required to make 100 parts of finished salad dressing.

| Ingredient | Proportion, parts by weight | |
|---|---|---|
| | Suitable range | Preferred range |
| Oil | 10–50 | 25–40 |
| Sweetening agent | 5–15 | 8–12 |
| Total starch | 3–10 | 3–10 |
| Salt | 1– 2.5 | 2 |
| Acidulent calculated as acetic acid (dry basis) | 0.7– 1.3 | 1 |
| Egg yolk | 2– 8 | 3–5 |
| Spice, flavoring and the like | (¹) | (¹) |
| Water | (²) | (²) |

¹ As desired.
² To make 100 parts.

In the starch base, the proportion of waxy maize starch may vary from about 5 to 50 parts at the outside for 100 parts of the total starch. For best results in quality of the finished dressing, the range is from about 8 to 45 parts of the waxy maize starch, the exact proportion varying advantageously, as indicated for example in the drawing, with the percentage of oil in the dressing. Even with the highest oil content a proportion of the waxy maize starch that is less than about 8% makes a salad dressing too short, whereas with the lowest oil content a proportion of the waxy maize starch substantially in excess of 45 parts to 100 parts of the total starch makes a salad dressing that is too long or stringy.

In general the method of making the improved salad dressing comprises pasting the starch with the sweetening agent, salt, a part of the vinegar (or other acidulent), and all of the water which is to be present in the finished composition except for the small amount of water added with the remainder of the vinegar or the like. This pasting is effected preferably by dissolving the salt, sweetener and a part of the vinegar in most of the required water, warming the solution to the pasting point of the starch and then introducing the starch in the form of a slurry with an additional portion of the water. In a separate container there is formed an emulsion of the egg yoke, part of the oil, and a small part of the vinegar. This emulsion is formed by whipping these three ingredients together.

After the emulison is formed, the starch paste prepared as described above is cooled to about room temperature and suitably to a temperature below 90° F., may be allowed to set to a stiff gel, is introduced into the emulsion, and the whole is whipped vigorously. This whipping is continued and the remainder of the oil and vinegar are added slowly while the whipping is continued until a uniform emulsion is produced. Spices, mustard, or other flavoring materials, if any, that may be desired are incorporated at any state of the operation, say, in the final whipping in of the last of the oil. When the pasted starch is incorporated into the emulsion and then homogenized, the setting to a gel referred to above may be omitted. In any case, the pasted starch must be cooled.

Operations that are not herein described in detail are those that are conventional in the manufacture of salad dressings. Thus, the dressing made as described above is ordinarily run through a homogenizer or colloid mill as the final step, for producing complete homogeneity and fine dispersion of the emulsified ingredients.

The attached drawing to which reference is made illustrates certain advantages of the composition made with the two varieties of corn starch as the sole starch in the salad dressing base. In this drawing there are plotted two graphs showing, respectively, the percentages of waxy maize starch and tapioca starch, in the total starch, that are required for comparable consistencies of the finished salad dressing, with different percentages of oil in the finished dressing. Determinations were made for each graph at points corresponding to 20%, 27.5%, and 35% of oil in the finished dressing, the proportion of total starch for these points being, respectively, 9%, 7%, and 5%. The graphs as shown are extended somewhat beyond these experimentally determined points.

It will be seen that, for a given percentage of oil and total starch, there is required for any comparable consistency of the salad dressing less of the waxy maize starch than of the tapioca starch. Since the corn starch is the least expensive and most readily available starch of any of those used, the saving in cost of the special starch is an important item.

The graphs in the shaded portions show the permissible tolerances in the proportions of the special starches for proper and comparable consistencies of the finished dressing. The tolerance is much wider when the starch is waxy maize starch than is the case with tapioca. Furthermore, the tolerance is greater with the waxy maize when the proportion of it in the whole composition is larger. This is especially important because, when the proportion of the starch base is relatively large and the proportion of oil small, there is particular difficulty in working at all times within the permissible tolerance limits for the special starch. When the waxy maize starch is used, there is approximately twice as much tolerance allowable at 20% of oil, for example, as when the tapioca is used.

The invention will be further described in connection with the following specific examples and formulas.

EXAMPLE 1

In a cooking vat, place two-thirds of the water, all of the sweetener and salt, and one-half of the vinegar. Warm this mixture to about 165° F. and then add a slurry of the selected mixture of corn starch and waxy starch in the remaining third of the water. Raise the temperature to 185° F., with constant agitation and hold this temperature for 10 minutes, to give good pasting of the starch and emulsification, without undercooking or overcooking any of the starches. Pour the resulting emulsion into a container suitable for holding the mass until completely cooled, then allow to cool.

In a separate container, prepare an emulsion in the cold, using the egg yolks, a small portion of the edible oil, and a small portion of the remaining unused vinegar. Add to this emulsion the starch gel in the other container. Emulsify the resulting mixture by rapid agitation. Then add the remaining oil and vinegar slowly, so as to insure complete emulsification and a smooth character of the product. The finished dressing made as described is ordinarily run through a homogenizer or colloid mill.

EXAMPLE 2

The procedure is the same as in Example 1, through the stage of pasting the starch. The starch paste is then drawn off to a vat, in which the paste is constantly agitated and cooled to below 90° F. This cooled paste is then pumped into the second emulsion including the egg yolks and other ingredients made as described in Example 1, and the whole is whipped and finally homogenized.

20% oil salad dressing

A 20% oil dressing is made as described under Example 1 or 2 above, of the following formula:

|  | Percent |
|---|---|
| Corn starch | 5.5 |
| Waxy maize starch | 3.5 |
| Egg yolk | 3 |
| Corn oil | 19 |
| Sugar | 8 |
| Salt | 2 |
| Vinegar 5% | 20 |
| Water | 39 |
| Total | 100.0 |

27.5% oil salad dressing

A 27.5% oil dressing is made as described under Example 1 or 2 above, of the following composition:

|  | Percent |
|---|---|
| Corn starch | 5.0 |
| Waxy maize starch | 2.0 |
| Egg yolk | 3.0 |
| Corn oil | 26.5 |
| Sugar | 8.0 |
| Salt | 2.0 |
| Vinegar 5% | 20.0 |
| Water | 33.5 |
| Total | 100.0 |

35% oil salad dressing

A 35% oil dressing is made as described under Example 1 or 2 above, of the following composition:

|  | Percent |
|---|---|
| Regular corn starch | 4 |
| Waxy maize starch | 1 |
| Egg yolk | 3 |
| Corn oil | 34 |
| Sugar | 8 |
| Salt | 2 |
| Vinegar 5% | 20 |
| Water | 28 |
| Total | 100 |

In place of the waxy maize starch there may be substituted pound for pound, other waxy starch, as, for example, that from waxy sorghum.

The use of the waxy starch in the proportion stated overcomes the excessive shortness experienced when the salad dressing is made with all regular corn starch and gives a smooth satisfactory salad dressing.

The starch used in the above examples may be the ordinary refined corn starch, one selected for stability, or corn starch after modification in a usual manner to increase the stability when gelled, as measured by low rate of fall of viscosity on whipping, while preserving a thick body.

It will be understood that it is intended to cover all changes and modifications of the example of the invention herein chosen for the purpose of illustration which do not constitute departures from the spirit and scope of the invention.

What we claim is:

1. Salad dressing comprising a fine emulsion including pasted starch, an edible oil, a sweetening agent, salt, an acidulating material, egg yolk, and water; the starch including corn starch and waxy maize starch and the proportion of the waxy maize starch being approximately 8 to 45 parts for 100 parts of total starch.

2. In a salad dressing comprising a fine emulsion of oil and other salad dressing components with starch in pasted condition as the base, the improvement comprising waxy starch in the proportion of about 5 to 50 parts for 100 parts of total starch, the remainder of the starch being principally corn starch, and the starch base containing no substantial proportion of tapioca or arrowroot starch.

3. A salad dressing starch base consisting substantially exclusively of corn starch and waxy maize starch, the proportion of the corn starch being not substantially less than the proportion of the waxy maize starch.

BEN F. BUCHANAN.
RICHARD C. DRURY.